March 22, 1932. J. T. SHELTON 1,850,479
PIPE COUPLING SCREWING MACHINE
Filed Jan. 16, 1931 2 Sheets-Sheet 1
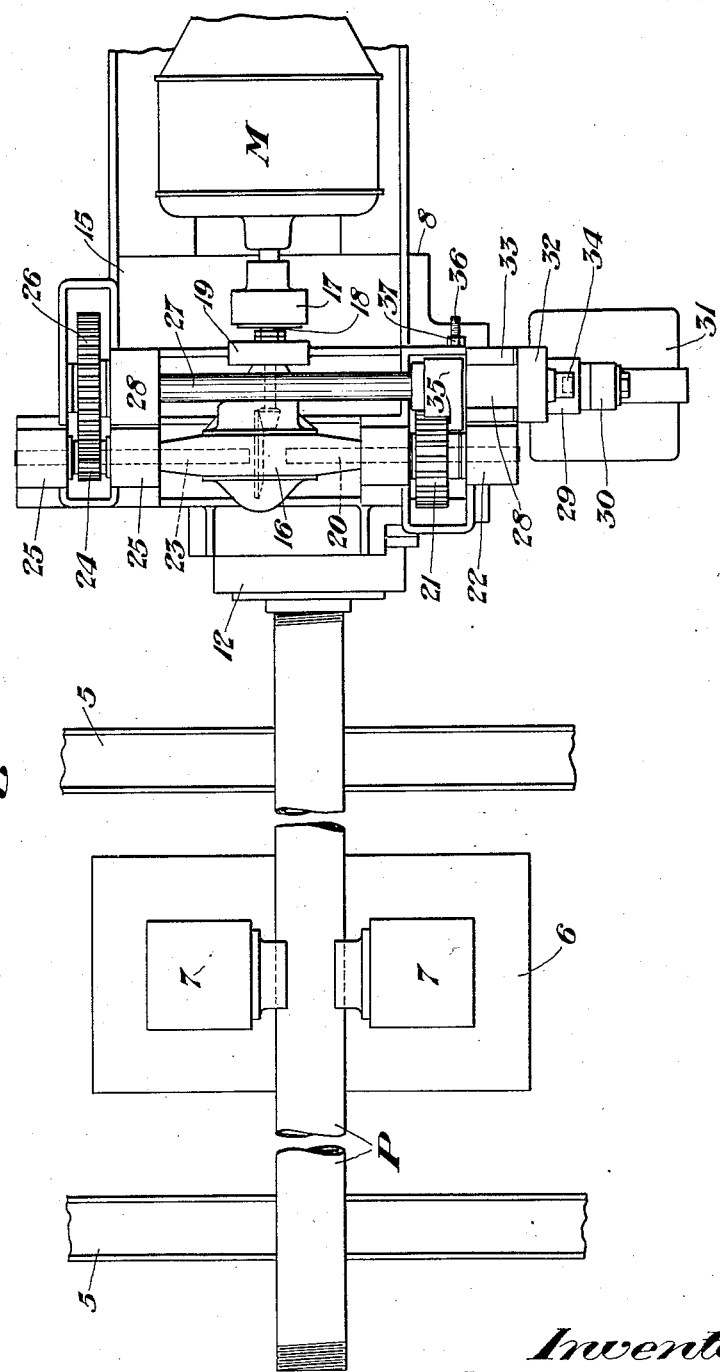
Inventor:
JAMES T. SHELTON,
by: Usina & Rauber
his Attorneys.

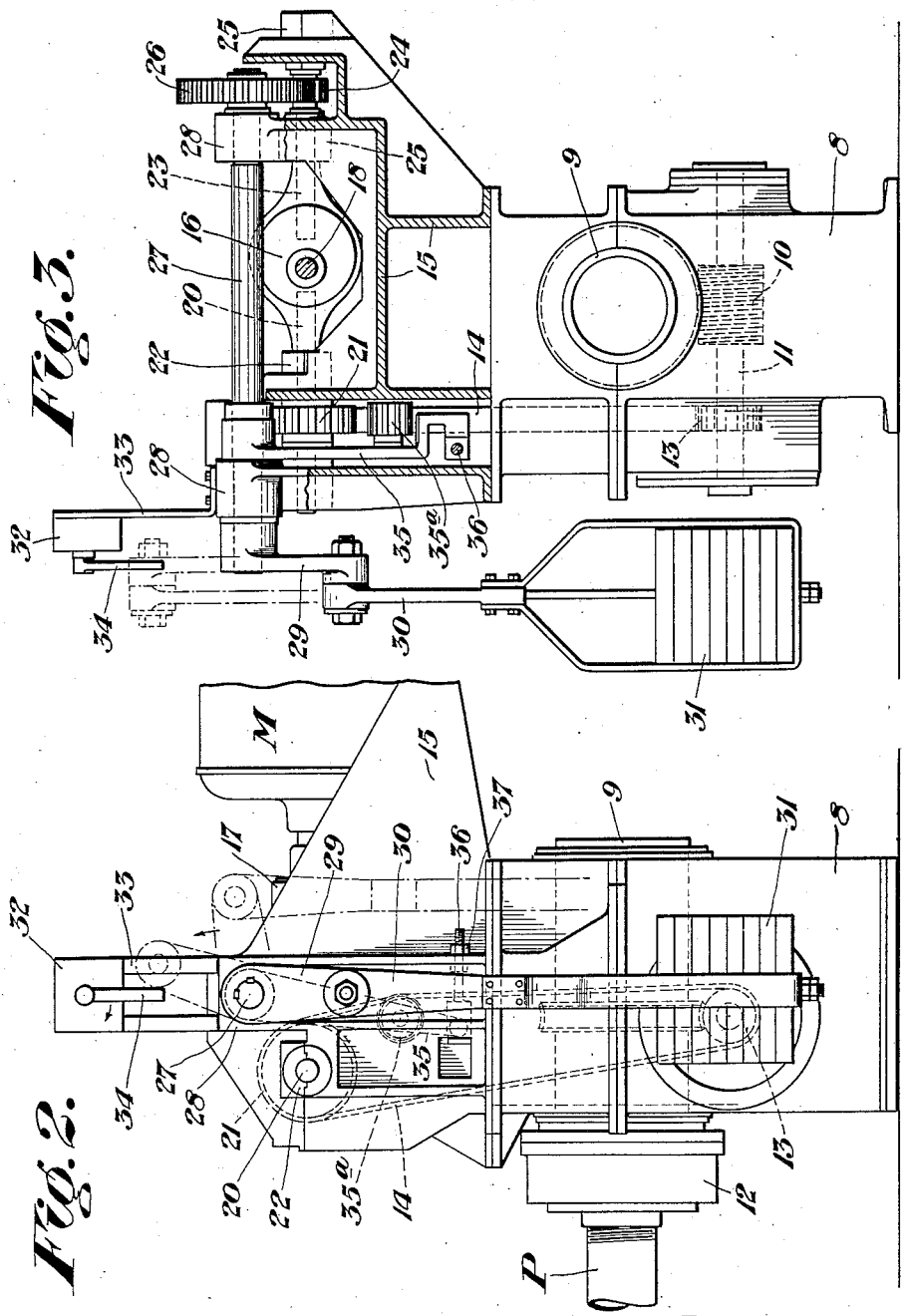

Patented Mar. 22, 1932

1,850,479

UNITED STATES PATENT OFFICE

JAMES T. SHELTON, OF PITTSBURGH, PENNSYLVANIA, ASSIGNOR TO NATIONAL TUBE COMPANY, A CORPORATION OF NEW JERSEY

PIPE COUPLING SCREWING MACHINE

Application filed January 16, 1931. Serial No. 509,256.

This invention relates to torque regulating drive mechanism and is particularly adapted for use with screwing-on machines for pipe couplings although not necessarily limited to such use, the object of the invention, broadly stated, being to provide a simplified type of drive unit adapted to be interposed between the prime mover and work-gripping and rotating means which will permit adjustment of the torque action as applied to said work-gripping means and wherein also, when a predetermined torque has been reached, the drive is automatically disconnected and the parts returned to their original positions ready to repeat the cycle.

The improved mechanism is shown applied to a screwing-on machine for pipe couplings, particularly those of the larger sizes, and when so used, it ensures that all couplings of a given size will be screwed on with a uniform degree of tightness and strain, the degree of tightness being readily adjustable to the point desired.

Numerous other objects and advantages resident in the improved mechanism will become apparent in view of the following descriptive matter taken in conjunction with the drawings; wherein:—

Figure 1 is a sectional plan view of a screwing-on machine showing the improved torque-regulating mechanism applied thereto;

Fig. 2 is a view in side elevation, parts being shown in alternate positions in dotted lines;

Fig. 3 is a view in sectional end elevation of the mechanism.

Referring to the drawings, the reference numeral 5 designates a pair of skids on which the pipe, indicated at P, is moved over a pipe-gripping machine, diagrammatically represented at 6, and the pipe gripped by a pair of grippers 7, which may be plunger operated or of any approved type, the foregoing parts being shown simply for the purposes of illustration and form no part of the features of the invention. The pipe is thus held in firm position with its threaded end ready to receive a coupling from the screwing-on machine.

The screwing-on machine as shown is of the worm-driven type and is particularly adapted for the larger-sized couplings, the base of the machine being indicated at 8, a chuck-holding barrel 9 being mounted to rotate in said base, the barrel being driven by a worm 10 mounted on a shaft 11, the chuck 12 for gripping the coupling being mounted on the barrel and having a limited range of longitudinal movement therein, said longitudinal movement being sufficient to compensate for the distance the coupling screws on the pipe. A sprocket gear 13 is mounted on the shaft 11 and the drive is transmitted to this sprocket by means of a chain or analogous flexible member 14.

The present improved type of torque-regulating drive is designed in such manner that it will drive the chuck until the coupling is screwed on the pipe to a predetermined degree of tightness, after which the driving energy is directed, by means of a differential, into lifting an adjustable weight suspended from a crank, the weight being adjusted to obtain the desired torque. When the crank turns through a certain radius, here shown as an arc of 180°, it throws a switch and stops the motor and the weight and crank return to their original positions by gravity.

The drive mechanism is mounted on a suitable frame casting 15, which is secured on the frame 8 of the screwing-on machine, and comprises a differential assembly which is generally indicated at 16 and may be of the conventional automobile type, the drive being applied to the differential by a motor M through a suitable flexible coupling 17 and drive shaft 18, the latter being mounted in a housing and supported at one extremity by a bracket 19. Projecting from one side of the differential housing is a shaft 20 having keyed thereon a sprocket gear 21, said shaft being mounted in suitable bearings 22 on each side of said gear, the sprocket chain 14 being passed around and in mesh with the gears 21 and 13, the drive being thus transmitted to the chuck 12 from one side of the differential 16.

The other side of the differential housing has a shaft 23 projecting therefrom and provided on its extremity with a pinion 24 and bearings 25. The pinion 24 meshes with a gear 26 which is keyed on the one end of a crank shaft 27 mounted in bearings 28. The other end of the shaft 27 has secured thereon a crank 29, and pivotally connected to said crank is a link 30, which has secured thereto and suspended therefrom an adjustable counterweight 31.

Above the crank 29 a limit switch 32 is mounted by means of a bracket 33, and said switch is provided with a contact arm 34 which projects into the radial path of the end of the crank 29. The switch 32 may be of any approved type and is interposed in the motor circuit or the line which conducts current to said motor, as will be understood.

As a means of taking up slack in the chain 14, an arm 35 is swiveled or pivotally mounted on the end of the crank shaft 27, and on this arm an idler sprocket 35ª is mounted and adapted to mesh with said chain. An adjusting screw 36 is pivotally secured at its one extremity to the lower end of the arm 35 and at its opposite extremity said screw is adjustably secured to the stationary frame 15 of the drive mechanism by means of adjusting and lock nuts 37. By adjusting the nuts 37, the idler sprocket 35ª may be adjusted relatively to chain 14, to take up slack in the latter.

Briefly stated, the operation of the machine is as follows:—

The motor M driving through the differential assembly 16 will drive through the side that offers the least resistance as will be understood by those having a knowledge of the usual type of differential constructions. When a coupling is first started on the pipe P, the torsional resistance set up thereby is comparatively slight, and since one side of the differential, or the shaft 23, is held from turning by the resistance of the counterweight 31 acting back through the crank 29, crank shaft 27, gear 26 and pinion 24, the drive will be applied to the shaft 20, which in turn rotates the sprocket gears 21 and 13 and the barrel 9 on which the chuck 12 is mounted, thus screwing the coupling on the pipe. The coupling continues to screw on the pipe until the torsional resistance of the joint, working back through the differential, is equal to or greater than the resistance set up by the counterweight 31 on the other side of the differential, which by this time will have been elevated to its mid position or the crank 29 will have moved in an arc of substantially 90°, the position where said weight offers its maximum resistance.

When the coupling has been screwed on the pipe to a point where the torsional resistance of the coupling equals or exceeds the resistance of the counterweight, the drive to the chuck through the shaft 20 will be stopped and the differential will operate the differential shaft 23 and crank shaft 27 through the gearing 24—26 so as to rotate the crank arm 29 around to a substantially vertical position where it contacts with the switch arm 34 of limit switch 32, throwing the switch and interrupting the motor circuit and stopping the motor M. The weight and crank then return to their original positions by gravity and the operator releases the pipe and coupling from the chuck and the machine is ready to repeat the cycle.

By adjusting the weight 31, the torque exerted in screwing on the couplings can be adjusted to suit different sizes, and once this adjustment is effected, all couplings of a given size will be screwed on with uniform strain and degree of tightness, a feature which ensures maximum satisfaction in the field and minimum strain on the threads.

What is claimed as new is:

1. In a screwing-on machine for pipe couplings, a chuck, a differential drive assembly, a motor for driving said differential assembly, one side of said differential assembly being operatively connected to said chuck for rotating said chuck, and adjustable torque means connected to the other side of said differential assembly, said means comprising a shaft operatively connected to said last named side of said differential assembly, a crank on said shaft, and an adjustable counterweight suspended from said crank.

2. In a screwing-on machine for pipe couplings, a chuck, a differential drive assembly, a motor for driving said differential assembly, one side of said differential assembly being operatively connected to said chuck for rotating said chuck, a limit switch for stopping said motor and adjustable torque means connected to the other side of said differential assembly adapted to automatically relieve the drive to said chuck and to operate said switch to stop said motor, said means comprising a shaft operatively connected to said last named side of said differential assembly, a crank on said shaft and an adjustable counterweight suspended from said crank, said shaft and said crank being adapted to be rotated when the torsional resistance of the chuck drive overcomes the resistance of said counterweight and said crank being adapted to operate said limit switch when said crank is rotated a predetermined amount.

3. In a screwing-on machine for pipe couplings, a chuck, a differential drive assembly, a motor for driving said differential assembly, shafts projecting from opposite sides of said differential assembly, one of said shafts being operatively connected to said chuck for rotating said chuck, a limit switch for stopping said motor, and an adjustable torque means connected to the other of said shafts and adapted to automatically relieve the drive to said chuck and to operate said switch to stop said motor, said means comprising a crank shaft operatively connected to said last named shaft, a crank on said crank shaft and an adjustable counterweight suspended from said crank, said crank shaft being adapted to rotate when the torsional resistance of the chuck drive overcomes the resistance of said counterweight and said crank being adapted to operate said limit switch when said crank is rotated a predetermined amount.

In testimony whereof, I have hereunto set my hand.

JAMES T. SHELTON.